United States Patent [19]

Bonnet et al.

[11] 4,387,196

[45] Jun. 7, 1983

[54] PROCESS FOR THE PRODUCTION OF SILICONE RESINS

[75] Inventors: Jean-Claude Bonnet, Mt Saint Aignan, France; Kenneth B. Pithouse, Swindon, England

[73] Assignee: Raychem Limited, London, England

[21] Appl. No.: 350,067

[22] Filed: Feb. 18, 1982

Related U.S. Application Data

[63] Continuation of Ser. No. 126,674, Mar. 3, 1980, abandoned, which is a continuation of Ser. No. 927,770, Jul. 25, 1978, abandoned.

[30] Foreign Application Priority Data

Jul. 27, 1977 [GB] United Kingdom ............... 31535/77

[51] Int. Cl.³ ................................................ C08L 83/04
[52] U.S. Cl. ...................................... 525/477; 525/478; 528/10; 528/12; 528/14; 528/21; 528/34; 528/43
[58] Field of Search .................. 525/477, 478; 528/10, 528/12, 14, 21, 34, 43

[56] References Cited

U.S. PATENT DOCUMENTS

| | | | |
|---|---|---|---|
| 2,027,962 | 1/1936 | Currie ................................... | 264/78 |
| 3,017,386 | 1/1962 | Brown, Jr. et al. .................. | 528/14 |
| 3,086,242 | 4/1963 | Cook et al. .......................... | 264/209 |
| 3,120,500 | 12/1964 | Huntington et al. ................. | 528/14 |
| 3,294,738 | 12/1966 | Krantz ................................. | 528/11 |
| 3,318,844 | 5/1967 | Krantz ................................. | 528/34 |

FOREIGN PATENT DOCUMENTS 607253 1/1946 United Kingdom .
768755 2/1955 United Kingdom .

OTHER PUBLICATIONS

Smith & Kellum, Anal. Chem. 39, (1967), 339.

*Primary Examiner*—Melvyn I. Marquis
*Attorney, Agent, or Firm*—Lyon & Lyon

[57] ABSTRACT

The invention relates to a novel process for the production of a thermoplastic, high softening point polysiloxane resin which comprises reacting a solvent-soluble partially condensed organosiloxane with a silane capping agent. The resins so produced are useful as electrical insulator material and also as hold out agents for heat recoverable articles.

33 Claims, No Drawings

PROCESS FOR THE PRODUCTION OF SILICONE RESINS

This is a continuation of application Ser. No. 126,674, filed Mar. 3, 1980, which is a continuation of application Ser. No. 927,770, filed July 25, 1978, both now abandoned.

This invention relates to silicone resins, and more particularly to a process for the production of thermoplastic silicone resins having an improved combination of physical properties.

Silicone resins are widely used in industry and, for example, silicone resin block copolymers have been disclosed as particularly useful as hold-out agents for heat-shrinkable silicone elastomers (Weyer U.S. Pat. No. 3,360,496). However such resins have, in general, inferior electrical properties to silicone elastomers, and it has therefore been suggested that polymonomethylsiloxanes, which have better electrical insulation properties, should be used in place of the silicone resin block copolymers (British Patent No. 1,409,517). Unfortunately the polymonomethylsiloxanes of British Patent No. 1,409,517 are unstable and tend to gel on storage and their softening points are too low for many applications. It has been proposed to improve the stability of silicone resins by heating a solution of the resin in the presence of an alkali (Hyde U.S. Pat. No. 2,482,276) but the resins so produced have no definite softening point, or have a softening point which is too high for conventional moulding operations, and have an unacceptable weight loss at elevated temperatures. It has also been proposed to improve the stability of certain silicone resins by heating in a mixed water/organic solvent solution (Merill U.S. Pat. No. 3,450,672) but this process is susceptable to gelation unless care is taken with the concentration of the solutions used, and gives products having insufficient gel stability which are capable of further condensation, creating the possibility of voiding in the finished product.

It is known to treat polysiloxane resins with the trimethylchlorosilane. Huntingdon, U.S. Pat. No. 3,120,500 discloses a method of producing a resin of more uniform properties which comprises reducing the silanol content of a silicone hydrolysate by heating a solution of the silicone hydrolysate in the presence of an alkali catalyst, neutralising the solution, for example by the addition of hydrochloric acid or trimethylchlorosilane, and then reintroducing silanol groups by controlled hydrolysis at elevated temperature and pressure. There is no suggestion that the trimethylchlorosilane reacts with the polysiloxane, which is described as "relatively silanol-free", and in any event, the process is specifically designed to produce thermosetting silicone resins. Finally, British Pat. No. 1,377,383 describes the production of an organopolysiloxane release composition in which a resin prepared by cohydrolysis of a mixture of organo silanes in the presence of a silica hydrosol or a tetrahalo- or tetraalkoxysilane is reacted with trimethylchlorosilane to reduce its SiOH content, but there is no suggestion that the gel stability of the resin, or its softening point, are improved thereby.

According to the present invention, it has now been found that an improvement in the physical properties of a thermoplastic siloxane resin having further condensable SiOH groups may be obtained by reaction with a capping agent.

The present invention provides a process for the production of a thermoplastic, high softening point polysiloxane resin which comprises reacting a solvent soluble partially condensed organosiloxane having the unit formula $(RSiO_{1.5})_a (R'R''SiO)_b$ wherein R, R' and R'' are hydrogen or organic groups which may be the same or different, at least 85% of the R groups in the $RSiO_{1.5}$ units being organic groups and at least one of the groups R', R'' in each of the R'R''SiO units being organic groups, a is from 0.6 to 1, b is from 0 to 0.4 and $a+b=1$, with a silane capping agent.

Preferably after reaction with the capping agent the resin is equilibrated by heating, or by the use of an equilibration catalyst.

The polysiloxane resins produced by the process of the present invention are thermoplastic, that is to say, they can be fabricated at temperatures above their softening point substantially without gelation, to give products which are still substantially organic solvent soluble and melt processable. They are thus distinguished from the majority of polysiloxane resins known to the art which contain a substantial number of further condensable groups and are thermosetting.

Polysiloxane resins produced by the process of the present invention may have a softening point in excess of 50° C., and preferably in excess of 70° C. In this specification softening point is defined as the softening point measured by thermomechanical analysis (TMA), using, for example, a Du Pont TMA 942 instrument.

In this method a flat-sided flake of resin approximately 1 mm thick is placed under a 0.10 inch diameter flat-ended probe loaded with a 2 gram weight. The instrument is set at a sensitivity of 2 mil/inch and the sample heated at a rate of 10° C./minute. The softening point is taken as the first deviation from the base-line on the output chart which runs at 10° C./inch for the x axis.

The partially condensed organo siloxane used as the starting point for the present invention is substantially uncrosslinked, or at least is insufficiently crosslinked to render it insoluble in organic solvents such as, for example, benzene, toluene, xylene, petroleum ether, cyclohexane, chlorinated hydrocarbons, aliphatic and aromatic ethers and n-butylacetate. The organosiloxane is partially condensed, that is to say it comprises residual SiOH groups capable of further condensation on heating, or in the presence of a suitable catalyst, to produce a crosslinked infusible material. The percentage by weight, based on the weight of the resin, of said hydroxyl groups is preferably from 1 to 10 percent by weight, as measured by the method of Smith & Kellum, Anal. Chem 39 (1967) 339.

The method involves the rapid condensation of SiOH groups using a boron trifluoride-acetic acid complex catalyst in the presence of pyridine. The resin is dissolved in dry xylene, and pyridine and catalyst added, followed by addition of dry toluene. The solution is azeotropically distilled until all the water liberated by the condensation has been collected. The water in the distillate is then determined by Karl-Fischer titration. Corrections for traces of water in the solvents are made by performing a blank test. This method gives results which are usually significantly higher than those obtained by other methods such as infrared spectroscopy, but it is believed that the method is more sensitive and gives results which more accurately reflect the total hydroxyl content of the resin.

In the unit formula for the organosiloxane, the group R may be hydrogen or an organic group, provided that at least 85% of the R groups are organic groups. Where R is an organic group, this is preferably a hydrocarbon group, most preferably at methyl or phenyl group. However, other hydrocarbon groups such as alkyl, aryl, aralkyl, alkaryl, alkenyl, cycloalkyl and cycloalkenyl groups may also be used, for example ethyl, propyl, butyl, vinyl, allyl, tolyl, xylyl, benzyl, cyclohexyl, phenylethyl and naphthyl groups, and substituted hydrocarbon groups, for example halo-substituted hydrocarbon groups amino-substituted hydrocarbon groups, and cyano-substituted hydrocarbon groups. The resin may, of course, comprise more than one of the groups R listed above if desired.

The groups $R',R''$ may be hydrogen, or organic groups which may be the same or different, provided that at least one of the groups $R',R''$ is an organic group. Preferably the groups $R',R''$ are each independently methyl or phenyl groups, but they may also optionally be one or more of the hydrocarbon or substituted hydrocarbon groups as listed above for R. Most preferably the organosiloxane resin comprises only methyl groups, or comprises methyl groups with up to 80% of the groups R being phenyl. The process of the invention is particularly useful when applied to partially condensed monoorgano siloxanes ($b=0$) and especially to partially condensed monomethyl polysiloxanes, monophenyl polysiloxanes and monomethylphenyl polysiloxanes in which the ratio of methyl to phenyl groups on a molar basis from 1:3 to 3:1.

The partially condensed organo siloxane starting material for the process of the present invention may be prepared by hydrolysis of the appropriate hydrolysable organosilane or mixture of silanes.

Suitable hydrolysable organosilanes include, for example, monoorganosilanes which may be organohalosilanes, organoalkoxysilanes and organocarboxysilanes such as, for example, methyldichlorosilane, methyltrichlorosilane, methyldiisopropoxysilane, methyltriisopropoxysilane, methyldiacetoxysilane, methyltriacetoxysilane, phenyldichlorosilane, phenyltrichlorosilane, phenyldiisopropoxysilane and phenyltriisopropoxysilane. The preferred hydrolysable monoorganosilanes are those of formula R SiCl$_3$ RSi (QAlk)$_3$ and RSi (OCOAlk)$_3$ where Alk represents an alkyl group, and R is as previously defined.

Other suitable hydrolysable organosilanes include diorganosilanes and in particular diorganohalosilanes, diorganoalkoxysiloxanes and diorganocarboxysilanes, for example, dimethyldichlorosilane, dimethyldiisopropoxysilane, dimethyldiacetoxysilane, diphenyldichlorosilane, diphenyldiisopropoxysilane, and diphenyldiacetoxysilane. The preferred hydrolysable diorganosilanes are those of formulae $R'R''SiCl_2$, $R'R''Si (OAlk)_2$ and $R'R' (OCOAlk)_2$ where $R',R''$ and Alk are as previously defined. Mixtures of any of the above hydrolysable organosilanes may be used, and also mixed organohaloalkoxy silanes formed by the addition of an alcohol, and particularly an aliphatic alcohol, for example, methanol, ethanol, propanol, isopropanol, butanol, pentanol, hexanol, or octanol to an organohalosilane.

Hydrolysis of the organo silane may be effected by adding a solution of the silane in a suitable organic solvent to water, using if necessary a co-solvent for water and the organic solvent to maintain the hydrolysis mixture substantially homogeneous. Suitable organic solvents are, for example, any which are inert to the reactants during the hydrolysis, for example, benzene, toluene, xylene, petroleum ether, cyclohexane, chlorinated hydrocarbons aliphatic and aromatic ethers and n-butylacetate. Suitable co-solvents include, for example, acetone, methyl ethyl ketone, dioxane, tetrahydrofuran, isopropanol and cellosolve. The organic solvent is preferably used in an amount of from 0.1 to 1.5 parts by weight, based on the weight of organo silane. The co-solvent, if used is preferably mixed with the water, and the organic solvent solution of the silane added thereto. Excess organic solvent may be added to the mixture of water and co-solvent to minimise any possibility of gelation during the reaction. Reaction temperatures are usually maintained at from 0° to 80° C., preferably from 20° to 60° C. After reaction, the aqueous layer is removed, the organic solution neutralised, for example with sodium bicarbonate, and dried. The silane capping agent is then added, preferably in an amount of from 0.0005 to 0.06 parts by weight, most preferably from 0.005 to 0.02 parts by weight, based on the weight of partially condensed organosiloxane. The function of the capping agent is to cap or block certain reactive sites on the partially condensed organosiloxane.

Although the invention is not limited to any particular theory, it is believed that the effect of the capping agent is to react with certain of the SiOH groups in the polysiloxane, which would otherwise be most readily available for condensation reactions. Preferably the silane capping agent is a monofunctional organosilane. Suitable monofunctional organosilanes include, for example, diorganosilanes and triorganosilanes, especially halo-, alkoxy-, and carboxydiorganosilanes and triorganosilanes, such as, for example chlorodimethylsilane, chlorotrimethylsilane, chlorodiphenylsilane, chlorotriphenylsilane, isopropoxydimethylsilane, isopropoxytriphenylsilane, acetoxydimethylsilane, acetoxytrimethylsilane, acetoxydiphenylsilane, acetoxytriphenylsilane, and in general, silanes of the formulae $R_1R_2R_3$ SiCl, $R_1R_2R_3$ Si (OAlk) $R_1R_2R_3$ Si (OCOAlk) where $R_1, R_2$, and $R_3$ are hydrogen, or organic groups which may be the same or different, provided that at least two of the groups $R_1, R_2, R_3$ are organic groups. Preferably the groups $R_1, R_2, R_3$ are each independently methyl or phenyl groups, but they may also optionally be one or more of the hydrocarbon groups or substituted hydrocarbon groups listed above for R.

Mixtures of silane capping agents may be used if desired. Addition and reaction of the silane capping agent are preferably carried out at temperatures of from 20° to 150° C., most preferably from 80° to 120° C. After addition of the capping agent, the resin organic solvent solution is preferably heated at a temperature of from 60° to 150° C. for a period of from 5 to 120 minutes, most preferably from 30 to 60 minutes, to equilibrate the resin. An equilibration catalyst maybe added if desired, for example, an acid, an alkali, a metal soap or kieselguhr, but this is not normally necessary as the solution is usually acidic after the capping reaction. After equilibration the resin solution may be washed to neutrality and stripped to yield the solid resin.

The polysiloxane resins of the present invention may be given a controlled degree of crosslinking if desired, for example after processing and fabrication, by the use of radiation or chemical crosslinking agents. Polysiloxane resins according to the present invention having substituents comprising olefinically unsaturated groups capable of undergoing crosslinking reactions, especially vinyl or allyl groups, are particularly suitable for crosslinking in this fashion. For most purposes only a minor amount of substituents comprising olefinically unsaturated groups is necessary, usually up to 5%, preferably up to 2%, on a molar basis. The resins may be crosslinked using radiation doses of from 2 to 80 megarads, preferably 5 to 40 megarads, or by using a chemical crosslinking agent such as, for example, a peroxide. Suitable peroxides are those that decompose rapidly within the range of 150° C. to 250° C., including, for example, dicumyl peroxide 2,5-bis (t-butylperoxy)-2,5-dimethylhexane, 2,5-bis (t-butylperoxy)-2,5-dimethylhexyne and α,α-bis (t-butylperoxy) diisopropylbenzene. In a typical chemically crosslinkable composition there will be about 0.5 to 5 parts by weight of peroxide per 100 parts of polysiloxane resin. The peroxide may be adsorbed on an inert carrier such as calcium carbonate, carbon black, or keiselguhr; however, the weight of the carrier is not included in the above range.

In some cases it may be desirable to add to the crosslinkable polysiloxane resin a co-agent to assist in the crosslinking reaction. Such co-agents usually contain multiple unsaturated groups such as allyl or acrylic esters. While their mode of action is not known with certainty, it is believed that they react with the initial radical formed on the polysiloxane backbone to form a more stable radical, which undergoes coupling reactions to form crosslinks more readily than chain scission reactions. The co-agent can be for example, N,N'-m-phenylene-dimaleimide, trimethylpropane, trimethylacrylate, tetrallyloxyethane, triallylcyanurate, triallyl isocyanurate, tetramethylene acrylate, or polyethylene oxide glycol dimethacrylate. The amount of the co-agent is preferably up to about 5 parts by weight per 100 parts of the polysiloxane, and preferably from 1 to 3 parts by weight per 100 parts of the polysiloxane.

The thermoplastic polysiloxane resins produced by the process of the present invention may be used with outstanding success in electrical insulation applications as described and claimed in the specification of our British Patent Application No. 31,608/77 for example as components of electrical insulation compositions having improved fire retardancy and low smoke emission. They may also find application in electric power transmission systems, for example, in arc and track resistant insulation materials. Another major application for the polysiloxane resins produced by the process of the present invention is as holdout-agents for heat recoverable compositions, particularly heat recoverable silicone elastomer compositions, and accordingly heat recoverable polymeric compositions comprising the monoorganopolysiloxanes included within the invention. A heat recoverable material is one which has the property of plastic or elastic memory, and for example, may have been deformed at an elevated temperature and then cooled whilst maintained in the deformed state. A heat recoverable article treated in this manner will retain its deformed state until it is again heated, at which time it will recover towards its original shape. Examples of heat recoverable articles and methods of making them may be found in Currie U.S. Pat. No. 2,027,962 and Cook et al U.S. Pat. No. 3,086,242, the disclosures of which are incorporated herein by reference.

Polysiloxane resins produced according to the process of the present invention have improved softening points as measured by TMA, in comparison with conventional materials which, although they are often quoted as having higher softening points, have been found to give low values by TMA measurement. It has been found by experiment that TMA measurements give a more accurate assessment of the suitability of the resins for use in heat recoverable compositions.

The monoorganopolysiloxanes of the present invention may be incorporated in a wide variety of polymers and elastomers to form heat recoverable materials. Such polymers and elastomers include especially silicone elastomers such as for example polydiorganosiloxanes, for example polydimethylsiloxane copolymers of mixed organosiloxanes for example, copolymers, block copolymers and terpolymers of monomethylsiloxane, dimethylsiloxane, and methylvinylsiloxane, fluorosilicones, for example those derived from 3,3,3-trifluoropropylsiloxane and carborane siloxanes, for example "Dexsil" polymers manufactured by Olin Matheson.

Thermoplastic monoorganopolysiloxane resins comprising units of the formula $RSiO_{1.5}$ and $R_1R_2R_3SiO_{0.5}$ where R, $R_1$, $R_2$, and $R_3$ are hydrogen, or organic groups which may be the same or different, at least 85% of the R groups in the $RSiO_{1.5}$ units being organic groups, and at least two of the groups $R_1,R_2,R_3$ in each $R_1R_2R_3 SiO_{0.5}$ unit being organic groups, and in which the ratio $RSiO_{1.5}$ units to $R_1R_2R_3 SiO_{0.5}$ units is from 1:0.0005 to 1:0.03 on a molar basis, are described and claimed in the specification of our British Patent Application No. 31,536/77.

EXAMPLE 1

A solution of methyl trichlorosilane (2165 g 14.5 moles), and methyl vinyldichlorosilane (42 g, 0.3 moles) in toluene (4340 g) was added over a period of one hour to a vigorously stirred mixture of toluene (1300 g), acetone (2300 g) and water (1080 g) maintaining the temperature at ~25° C. The resultant mixture was stirred for a further hour and then 2000 g water added and stirring continued for a further 30 minutes at a temperature of ~40° C.

The aqueous layer was separated and the organic layer washed to neutrality with water and sodium bicarbonate and dried by azeotropic distillation. Trimethyl chlorosilane (24 g 0.22 mole) was added and the mixture allowed to stand at room temperature overnight. The resulting solution was again washed to neutrality, dried, and the resin equilibrated with 0.5 ml of a 1% solution of KOH in ethanol for 1½ hours at reflux temperature. The solution of resin was washed with water to remove the equilibration catalyst and the solvent removed by distillation and vacuum stripping.

The resultant resin had a TMA softening point of 66° C. and a number average molecular weight of 4700. The resin remained completely soluble in toluene after heating for 1 hour in air at 150° C.

EXAMPLE 2

A mixture of phenyl trichlorosilane (68 ml), methyl trichlorosilane (23.5 ml) and vinyl trichlorosilane (3.75 ml) in toluene (100 ml) was added slowly over a 2 hour period to a vigorously stirred mixture of acetone (125 ml), toluene (15 ml) and water (25 ml). After addition was completed a further 100 ml water were added and the temperature maintained at 50° C. for a further 1 hour. The aqueous layer was removed and the organic layer washed to neutrality using water and sodium bicarbonate. Water was removed by azeotropic distillation. Trimethyl chlorosilane (5 ml) was added and the solution refluxed for varying periods of time, after which the solution was washed to neutrality, and the solvent removed by distillation and vacuum stripping.

| Time of Reflux after capping (mm) | 5 | 15 | 30 | 60 |
|---|---|---|---|---|
| OH content (% wt) | 1.72 | 1.68 | 1.30 | 1.05 |
| Number average molecular weight Mn | 3000 | 4300 | 4300 | 3600 |
| TMA softening point °C. | 88° C. | — | — | 132 |

The reduction in number average molecular weight is due to the formation of a low molecular weight fraction during equilibration. This can be shown by G.P.C. techniques. The weight average molecular weight increases during equilibration.

What is claimed is:

1. A process for the production of a thermoplastic, high softening point polysiloxane resin which comprises the steps of:
(a) reacting a solvent-soluble partially condensed organosiloxane having the unit formula:

$$(RSiO_{1.5})_a(R'R''SiO)_b$$

wherein R and R' are each independently hydrogen or an organic group, at least 85% of the R groups in the $RSiO_{1.5}$ units being organic groups, R'' is an organic group,
a is from 0.6 to 1,
b is 0 to 0.4, and a+b=1,
and wherein the organosiloxane comprises Si-OH groups capable of further condensation, the percentage by weight, based on the weight of the resin, of said hydroxyl groups being from 1 to 10, with a silane capping agent so as to cap some of the Si—OH groups, and
(b) equilibrating the product of step (a) to produce a product having a softening point in excess of 50° C.

2. The process of claim 1, in which the step of equilibrating comprises heating the product of step (a) in the presence of an equilibration catalyst.

3. The process of claim 1, in which R is a substituted or unsubstituted hydrocarbon group.

4. The process of claim 3, in which R is a methyl group or a phenyl group.

5. The process of claim 1 in which the groups R',R'' are hydrocarbon groups or substituted hydrocarbon groups.

6. The process of claim 5, in which the groups R',R'' are each independently methyl or phenyl groups.

7. The process of claim 1, in which the organic groups of the partially condensed organosiloxane are methyl groups.

8. The process of claim 6, in which up to 80% of the groups R are phenyl groups.

9. The process of claim 1, in which the partially condensed organosiloxane is a monoorganosiloxane.

10. The process of claim 9, in which the partially condensed organosiloxane is a monomethylpolysiloxane.

11. The process of claim 9, in which the partially condensed organosiloxane is a monophenylpolysiloxane.

12. The process of claim 9, in which the partially condensed organosiloxane is a monomethylmonophenylpolysiloxane in which the ratio of methyl to phenyl groups on a molar basis is from 1:4 to 4:1.

13. The process of claim 1, in which the partially condensed organosiloxane is one that has been prepared by hydrolysis of a hydrolysable organosilane or mixture of silanes.

14. The process of claim 13, in which the hydrolysable organosilane is a monoorganosilane.

15. The process of claim 14, in which the monoorganosilane has the formula $RSiCl_3$, $RSi(OAlk)_3$ or $RSi(OCOAlk)_3$ where Alk represents an alkyl group and R is as previously defined.

16. The process of claim 13, in which the hydrolysis is effected by adding a solution of the organosilane in an organic solvent to water.

17. The process of claim 16, in which a co-solvent for both the water and the organic solvent is added to maintain the hydrolysis mixture substantially homogeneous.

18. The process of claim 17, in which the co-solvent is mixed with the water and the organic solvent solution of the silane added thereto.

19. The process of claim 18, in which excess organic solvent is added to the mixture of water and co-solvent.

20. The process of claim 1, in which the silane capping agent is a monofunctional organosilane.

21. The process of claim 20, in which the silane capping agent is an organosilane of formula $R_1R_2R_3SiCl$, $R_1R_2R_3Si(OAlk)$ or $R_1R_2R_3Si(OCOAlk)$, where $R_1$, $R_2$ and $R_3$ are each independently hydrogen or organic groups, and Alk represents an alkyl group.

22. The process of claim 21, in which $R_1$, $R_2$ and $R_3$ are each independently methyl or phenyl groups.

23. The process of claim 1, in which the step of reacting is carried out at a temperature of from 20° to 150° C.

24. The process of claim 2, in which the step of equilibrating comprises heating the product of step (a) at a temperature of from 60° to 150° C. for a period of from 5 to 120 minutes.

25. The process of claim 24, in which the product of step (a) is heated in a solution in an organic solvent for from 30 to 60 minutes.

26. The process of claim 2, in which the catalyst is an acid, an alkali, a metal soap, or kieselguhr.

27. The process of claim 1, including the additional step of subsequently cross-linking the resulting polysiloxane resin.

28. The process of claim 27, in which the resulting polysiloxane resin has substituents comprising olefinically unsaturated groups capable of undergoing cross-linking reactions.

29. The process of claim 28, in which the olefinically unsaturated groups are vinyl or allyl groups.

30. The process of claim 28, in which the olefinically unsaturated groups are present in an amount of up to 2% on a molar basis.

31. A thermoplastic, high softening point, polysiloxane resin produced by a process according to claim 1.

32. An article which is heat-recoverable, which can be rendered heat-recoverable or which is heat-recovered, made from the polysiloxane resin of claim 1, in non-crosslinked or crosslinked form.

33. Electrical insulation made from the polysiloxane resin of claim 1, in non-crosslinked or crosslinked form.

* * * * *